(12) United States Patent
Firus et al.

(10) Patent No.: US 11,054,075 B2
(45) Date of Patent: Jul. 6, 2021

(54) COUPLING ELEMENT FOR A HYDRAULIC COUPLING

(71) Applicant: U.M. Gewerbeimmobilien GmbH & Co. KG, Werdohl (DE)

(72) Inventors: Artur Firus, Iserlohn (DE); Klaus Laufer, Meinerzhagen (DE)

(73) Assignee: U.M. Gewerbeimmobilien GmbH & Co. KG, Werdohl (DE)

( * ) Notice: Subject to any disclaimer, the term of this patent is extended or adjusted under 35 U.S.C. 154(b) by 0 days.

(21) Appl. No.: 16/760,216

(22) PCT Filed: Sep. 25, 2018

(86) PCT No.: PCT/EP2018/076002
§ 371 (c)(1),
(2) Date: Apr. 29, 2020

(87) PCT Pub. No.: WO2019/091658
PCT Pub. Date: May 16, 2019

(65) Prior Publication Data
US 2020/0332937 A1    Oct. 22, 2020

(30) Foreign Application Priority Data
Nov. 10, 2017   (DE) .................. 10 2017 126 459.0

(51) Int. Cl.
*F16L 37/34* (2006.01)
*F16L 37/23* (2006.01)
*F16L 37/35* (2006.01)

(52) U.S. Cl.
CPC .............. *F16L 37/34* (2013.01); *F16L 37/23* (2013.01); *F16L 37/35* (2013.01); *F16L 2201/20* (2013.01)

(58) Field of Classification Search
CPC . F16L 37/34; F16L 37/35; F16L 37/36; F16L 37/23
See application file for complete search history.

(56) References Cited

U.S. PATENT DOCUMENTS 6,776,187 B1   8/2004 Marquis et al.
9,291,293 B2 * 3/2016 Prust et al. ............. F16L 37/35
(Continued)

FOREIGN PATENT DOCUMENTS

DE          103 51 997 A1     6/2005
DE    10 2014 009 063 A1    12/2015
(Continued)

OTHER PUBLICATIONS

International Search Report of PCT/EP2018/076002, dated Mar. 15, 2019.
(Continued)

*Primary Examiner* — Kevin L Lee
(74) *Attorney, Agent, or Firm* — Collard & Roe, P.C.

(57) ABSTRACT

A coupling element for a pressure medium line hydraulic coupling includes a housing, a sleeve inner body, a pressure casing and a valve tappet. The housing has a flow channel for pressure medium. At least the inner body, the casing and the tappet can be shifted, during coupling, from a starting position, along the coupling axis in a first direction into a coupling position where a block secures a coupling plug to the coupling element. They can be shifted from the coupling position in a second direction opposite the first direction, along the coupling axis into a stop position blocking further movement of the casing in the second direction. The inner body and the tappet are moveable further in the second direction into an open position where a flow cross-section is released between the casing and the tappet and a lock acts on the inner body and the tappet.

19 Claims, 10 Drawing Sheets

(56) References Cited

U.S. PATENT DOCUMENTS

Figure 1:
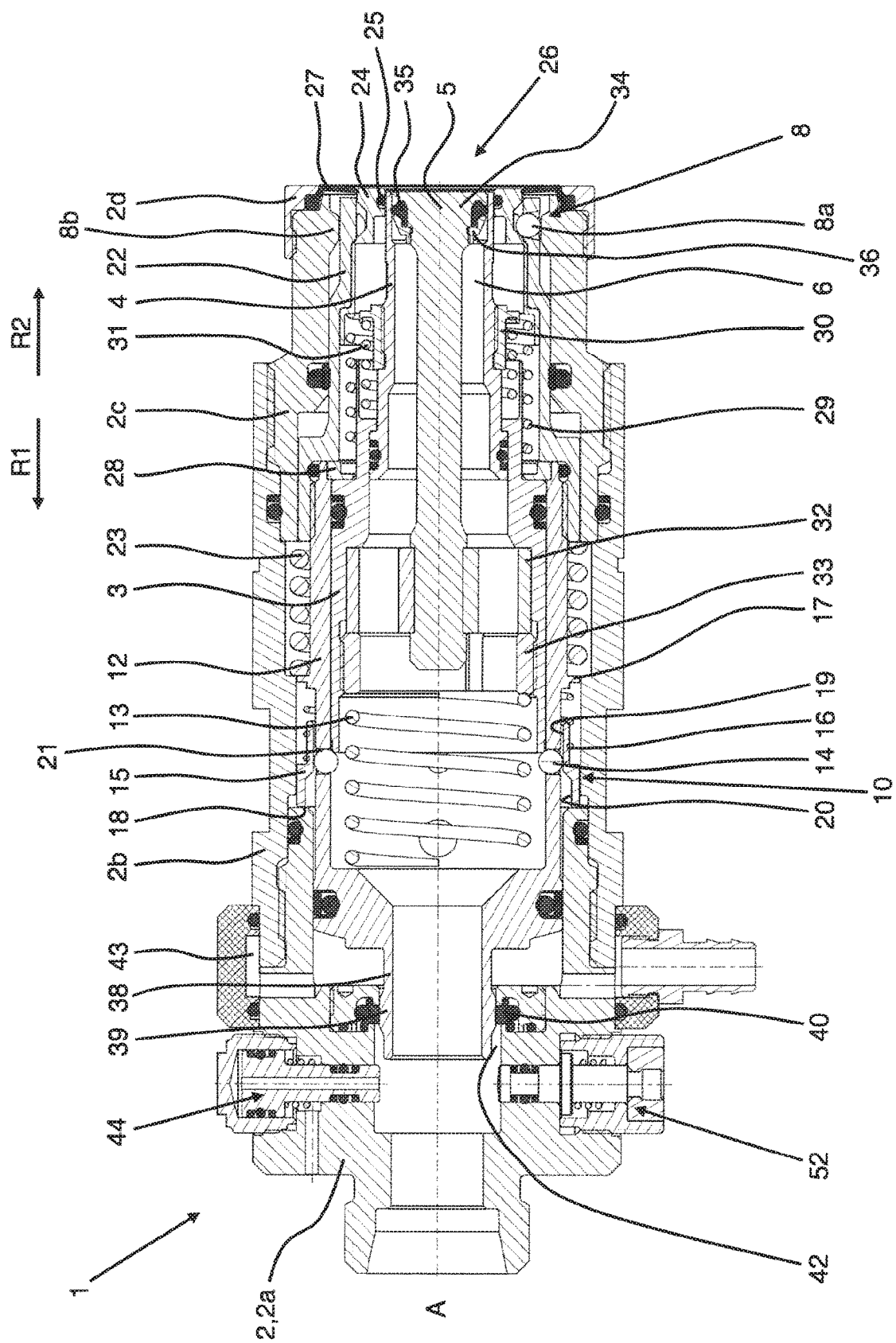

| | | | |
|---|---|---|---|
| 10,767,800 B2 * | 9/2020 | Laufer et al. ........... | F16L 37/23 |
| 2019/0003628 A1 | 1/2019 | Laufer et al. | |

FOREIGN PATENT DOCUMENTS

| | | |
|---|---|---|
| DE | 10 2015 222 639 A1 | 5/2017 |
| EP | 0 572 480 B1 | 9/1997 |
| EP | 2 687 767 A1 | 1/2014 |

OTHER PUBLICATIONS

ISO 16028, Hydraulic fluid power—Flush-face type, quick-action couplings for use at pressures of 20 MPa (200 bar) to 31,5 MPa (315 bar)—Specifications, First edition Dec. 15, 1999, 12 pages.
English translation of International Preliminary Report on Patentability in PCT/EP2018/076002, dated Feb. 4, 2020.

* cited by examiner

COUPLING ELEMENT FOR A HYDRAULIC COUPLING

CROSS REFERENCE TO RELATED APPLICATIONS

This application is the National Stage of PCT/EP2018/076002 filed on Sep. 25, 2018, which claims priority under 35 U.S.C. § 119 of German Application No. 10 2017 126 459.0, filed on Nov. 10, 2017, the disclosure of which is incorporated by reference. The international application under PCT article 21(2) was not published in English.

The invention relates to a coupling element for a hydraulic coupling of a pressure medium line, in particular a coupling sleeve for production of a shape-fit connection with a coupling plug. The coupling element has at least a housing, at least a sleeve inner body, at least a pressure bushing, and at least a valve tappet. The housing has at least a flow channel for a pressure medium and a coupling axis. At least the sleeve inner body, the pressure bushing, and the valve tappet are held within the housing so as to be displaceable along the coupling axis.

Hydraulic couplings, namely a combination of coupling sleeve and coupling plug, serve for connecting two sections of a pressure medium line and are used, in particular, for connecting hydraulic devices with a hydraulic source, for example for connecting a tool with an agricultural machine or a construction machine.

Coupling sleeves and coupling plugs of what is called a surface-sealing type are known from the state of the art, which are characterized in that in the non-connected—non-coupled—state a planar and closed surface is formed by the components of the coupling plug or of the coupling sleeve in the region of the connection interface. As a result, entry of dirt into the housing and between the components is prevented, and the loss of pressure medium is reliably avoided. Such surface-sealing hydraulic couplings are particularly suitable for use in dirty and dusty environments.

Engagement of a hydraulic coupling, in other words the production of a shape-fit connection between a coupling sleeve and a coupling plug, usually takes place in that the coupling plug is inserted into a coupling sleeve by a user, wherein at least one valve, in each instance, is opened by the force applied by the user, so as to connect a pressure medium line on the coupling plug with a pressure medium line on the coupling sleeve, in terms of flow technology, and also a shape-fit connection between coupling plug and coupling sleeve is produced, so as to stabilize the connection, i.e. the coupled state.

However, coupling elements known from the state of the art demonstrate the disadvantage that depending on the pressure applied to the coupling plug or the coupling sleeve, for example, connecting a tool with a hydraulic source is only possible with little reliability and with particular expenditure of force.

A person skilled in the relevant art is therefore faced with the task of indicating a coupling element, in particular a coupling sleeve, which is improved with regard to reliability and ease of operation.

The aforementioned task is accomplished, in the case of a coupling element for a hydraulic coupling, of the stated type, using the characteristics according to one aspect of the invention, namely in that at least the sleeve inner body, the pressure bushing, and the valve tappet can be displaced during a coupling process, in particular by means of a coupling plug, from a starting position in which the flow channel is closed off by the pressure bushing and the valve tappet, and the valve tappet lies against the connection interface in surface-sealing manner, along the coupling axis A, in a first direction, into the housing, into a coupling position. In the starting position, the coupling element is preferably pressure-free. The coupling element is configured for interaction with coupling plugs, preferably in accordance with ISO 16028 (status: 12/1999).

In the coupling position, a coupling plug can be fixed in place on the coupling element using a barrier means, in particular a plurality of barrier balls arranged distributed over the circumference. Preferably, the barrier balls enter into setbacks on the coupling plug provided for this purpose, so that the coupling plug is connected with the coupling element, in particular with the coupling sleeve, with shape fit. During this process, the coupling plug projects at least partially into the housing of the coupling element. In the coupling position, the flow channel of the coupling element is closed off by the pressure bushing and the valve tappet. The flow channel of the coupling plug is also closed off. In the coupling position, mechanical connection of the coupling element, in particular of a coupling sleeve, with a coupling plug takes place.

Proceeding from the coupling position, at least the sleeve inner body, the pressure bushing, and the valve tappet can be displaced in a second direction, opposite to the first direction, along the coupling axis A, all the way to a stop position, wherein in the stop position, further movement at least of the coupling bushing, in particular only of the coupling bushing, in the second direction is blocked.

Proceeding from the stop position, at least the sleeve inner body and the valve tappet continue to move in the second direction all the way to an open position, wherein in the open position, a flow cross-section between pressure bushing and valve tappet is released, and thereby the flow channel of the coupling element is released. The valve is opened by means of the movement from the position in which the pressure bushing is no longer moved further—the stop position—into the open position. Furthermore, in the open position, the pressure bushing and the valve tappet have entered at least partially into the coupling plug, and thereby the valve tappet of the coupling plug has also been forced into its open position, and the flow channel of the coupling plug is also released. In the open position, a locking means that is situated in its locking position acts on the sleeve inner body and the valve tappet; in particular, the locking means holds the valve tappet and the sleeve inner body in their open position. In the open position, a movement of the sleeve inner body and of the valve tappet in the first direction, in other words closing of the flow channel of the coupling element, is advantageously prevented by the locking means that acts on the sleeve inner body, which means particularly fixes the valve tappet and the sleeve inner body in place in the open position. In the open position, the coupling process, in other words the production of a mechanical connection and subsequent opening of a flow cross-section—opening of the valves is completed, and the flow channel is released.

For example, the pressure bushing is guided in the sleeve inner body in displaceable manner, and is sealed relative to an inner surface of the sleeve inner body by means of a gasket. Preferably, a reset means, in particular in the form of a helical spring, acts between pressure bushing and sleeve inner body. The pressure bushing surrounds the valve tappet and delimits the flow channel at least partially, so that the flow channel between pressure bushing and valve tappet can be released and closed off. The sleeve inner body is preferably held in the housing in displaceable manner and firmly connected with the valve tappet. The housing is configured in multiple parts, in particular, preferably configured in at least two, three or four parts.

The coupling element has at least a connection interface at a first end side of the housing, with which interface a connection, for example with a coupling plug, can be produced. On the second end side of the housing, lying opposite along the coupling axis, the coupling element has a connector interface with which a pipeline or a hose line can be connected, in particular can be screwed on by means of a union nut. The connector interface preferably serves for connection to a pressure medium source.

For coupling of the coupling element, in other words for producing a mechanical and fluidic connection between the coupling element and a coupling plug, the coupling plug is pressed into the coupling element at the connection interface in such a manner that the coupling plug displaces at least the sleeve inner body, the pressure bushing, and the valve tappet from the starting position, along the coupling axis, into the housing, into the coupling position. Both the coupling element and the coupling plug remain completely closed in the coupling position, so that no pressure medium can exit. Preferably, at least the coupling plug is under pressure during the coupling process. Displacement of at least the sleeve inner body, the pressure bushing, and the valve tappet from the coupling position into the stop position preferably takes place in that the coupling element has a pressure medium applied to it, proceeding from the connector interface, wherein the pressure medium acts at least on the sleeve inner body, the pressure bushing, and the valve tappet in such a manner that these are forced in the direction of the coupling plug, which has engaged into the coupling element with shape fit in the coupling position, and pressed into the plug at least partially. Before the coupling element has the pressure medium applied to it, the first part of coupling, namely the production of a mechanical connection between coupling element, in particular coupling sleeve, and coupling plug has been completed.

In the stop position, further movement of the pressure bushing is prevented in that the latter lies at least indirectly against the coupling plug, and is blocked from further movement by the presence of the coupling plug. Proceeding from the stop position, only the valve tappet, which is connected with the sleeve inner body, continues to move into the coupling plug, and thereby a flow cross-section is opened and a fluidic connection between coupling element and coupling plug has been produced.

In particular so as to prevent unintentional closing of the flow cross-section, a locking means is present, which is in its barrier position in the open position of the coupling element and prevents a movement of the sleeve inner body and of the valve tappet out of the open position back in the first direction, in other words in the direction of the stop position or of the coupling position. The locking means is in its barrier position in the starting position and in the open position, and is brought into its release position, at least temporarily, during the coupling process.

The functionality of the coupling element during the coupling process, as described above, acts as a pressure translator and makes it possible that even at high pressures applied in the coupling plug, it is possible to produce a connection between the coupling element and the coupling plug, in particular that opening of the valves is possible, in that part of the movement of the sleeve inner body, the valve tappet, and the pressure bushing is brought about by means of the pressure of a pressure medium that is present or applied in the coupling element. Production of only the mechanical connection is independent of the pressure present in the coupling plug. It is advantageous if actual opening of the coupling element and of the coupling plug takes place by means of the pressure present in the coupling element, in particular the operating pressure.

"Coupling" or the "coupling process" always comprises both the production of a mechanical connection between the coupling element and a coupling plug, for example, and opening of at least one, preferably of all the valves for production of a fluidic connection. The coupling element according to the present invention has the advantage that production of the mechanical connection and opening of the valves take place independently of one another. In the coupling position, production of the mechanical connection takes place, without the valves necessarily being opened. Only when the sleeve inner body, the pressure bushing, and the valve tappet are moved back, in other words in the second direction, does production of the fluidic connection take place by means of opening of the valves. Coupling consequently takes place in two stages.

According to a first embodiment of the coupling element, it is provided that the starting position can be reached proceeding from the open position, by means of an uncoupling process, namely in that the barrier means is released by means of displacement of at least a part of the housing, in particular of the whole housing, relative to the barrier means, so that a coupled coupling plug can be removed, and that a movement of the pressure bushing from the stop position in the second direction is released by means of removal of the coupling plug, until the pressure bushing lies against the valve tappet, forming a seal. The barrier means is released by means of a relative movement between the housing and the barrier means, in particular in that the barrier balls of the barrier means can enter into a setback on the housing so as to allow a movement of the coupling plug out of the coupling element and thereby a movement of the pressure bushing in the direction of the starting position, following the coupling plug.

According to a further embodiment of the coupling element, it is provided that a sleeve body is present, that the sleeve inner body is guided into the sleeve body, in particular that a reset means, preferably a spring, is arranged between sleeve body and sleeve inner body. For example, the locking means is arranged in such a manner that it acts between sleeve body and sleeve inner body. Preferably, the locking means prevents a relative movement between sleeve body and sleeve inner body, at least in the open position and in the starting position. During the coupling process, the locking means preferably gets into its release position before the coupling position is reached, so that in the coupling position, a relative movement between sleeve body and sleeve inner body takes place, in particular in that the sleeve inner body has penetrated further into the sleeve body after release by the locking means.

It is advantageous if a reset means in the form of a spring is arranged to act between the sleeve body and the sleeve inner body. In the starting position, the spring is held to act between sleeve body and sleeve inner body with a pre-load; the locking means prevents compression of the spring. In the starting position, the locking means, which prevents a movement of the sleeve inner body in the first direction, is situated in its barrier position, so that the sleeve inner body can be moved in the first direction only together with the sleeve body. During the coupling process, the spring is compressed during displacement of the sleeve inner body in the first direction, starting from the point in time when the locking means reaches its release position. The spring is consequently maximally compressed in the coupling position, so that it supports a movement of the sleeve inner body, the pressure bushing, and the valve tappet in the second direction, with a force directed in the second direction.

In particular so as to fix the coupling element in place in the open position, it is provided, according to further embodiment, that the locking means has at least a locking ball, a barrier bushing that surrounds the sleeve body, and at least a spring element, in particular that the locking means acts between sleeve body and sleeve inner body. Preferably, the locking means comprises a plurality of locking balls arranged over the circumference, in particular at least four locking balls. The locking balls pass through the sleeve body, preferably in recesses provided for this purpose, so that if the locking balls have passed through the sleeve body, the locking balls interact with the sleeve inner body on the inner side, and block its movement relative to the sleeve body.

In order for the locking balls to be held in this barrier position, a barrier bushing is arranged on the outer circumference of the sleeve body. The barrier bushing has a step-shaped cross-section, so that in a specific position of the barrier bushing with reference to the recesses for the locking balls, the locking balls can escape in the direction of the outside of the sleeve body, so as to release a movement of the sleeve inner body in the sleeve body.

The barrier bushing is held so as to move along the coupling axis, and loaded with spring element having a force that acts in the first direction, in other words in a direction into the housing. The spring element supports itself on a step provided for this purpose on the outer circumference of the sleeve body. On the side that lies opposite the spring element, the barrier bushing supports itself on the housing.

A further embodiment of the coupling element provides that a sleeve base body is present, that the sleeve base body is connected with the sleeve body, in particular specifically screwed onto the sleeve body. Furthermore, it is preferably provided that a sleeve reset means is present, and that the sleeve reset means acts between sleeve body and housing and/or between sleeve base body and housing. The sleeve reset means, in particular in the form of a helical spring, is preferably arranged in the housing in such a manner that it acts both on the sleeve body and on the sleeve base body, and thereby the unit formed by sleeve body and sleeve base body is constantly forced into a neutral starting position by the sleeve reset means. The unit formed by sleeve body and sleeve base body is situated in the neutral starting position, particularly in the starting position and in the open position. If, consequently, the housing is moved relative to the sleeve body and/or to the sleeve base body, and/or if the sleeve body and/or the sleeve base body is moved relative to the housing, the sleeve reset means acts counter to this movement. Deflection of the sleeve body and of the sleeve base body out of the starting position particularly takes place during coupling and uncoupling.

Preferably, it is provided that the barrier means of the coupling element interacts with the sleeve base body, in particular is arranged in the sleeve base body. It is advantageous if the barrier balls of the barrier means are held in recesses in the sleeve base body and escape into recesses in the housing in the event of a movement of the housing relative to the barrier means and/or the sleeve body and the sleeve base body.

For example, also in order to seal off the connection interface in the uncoupled starting position, it is provided, according to a further embodiment of the coupling element, that at least a piston is present, that the piston surrounds the pressure bushing, that the piston closes off the connection interface of the coupling at least partially in the starting position, preferably that a stripper gasket is provided at the connection interface, in particular that the stripper gasket lies against the piston or against the sleeve base body at least in the starting state.

In the starting position, the piston preferably lies approximately in a plane with the valve tappet and the end face of the pressure bushing. The piston preferably interacts with the barrier means, which also interacts with the sleeve base body and the housing. A movement of the piston out of the starting position is consequently prevented, in particular, by the barrier means, particularly in that the barrier balls have entered at least partially into the piston. In order to release a movement of the piston, the housing must be displaced relative to the barrier means. The piston can also be displaced in the first direction, in other words into the housing, and is held within the sleeve base body, surrounding the pressure bushing. Preferably, a piston spring is provided, which forces the piston into its starting position in the second direction.

In order to prevent dirt from getting into the coupling element during coupling or uncoupling, at least a stripper gasket is arranged at the connection interface, which gasket is held on an outer radius and extends radially inward in the starting position, in the direction of the coupling axis. Preferably, the stripper gasket has a radial expanse such that it lies against an outer circumference of the piston or against an outer circumference of the sleeve base body in the starting position. The stripper gasket, which lies against the sleeve base body, is also provided for exemplary embodiments without a piston.

The connection with the coupling plug can advantageously be simplified if, according to a further embodiment, it is provided that viewed in the coupling axis direction, a support bushing is arranged between sleeve base body and sleeve body, and that the support bushing serves as a bearing for a piston spring arranged between piston and support bushing. The piston spring consequently does not support itself on the sleeve inner body, as is usual in the case of coupling elements of the stated type, but rather on the sleeve body or the sleeve base body, by way of the support bushing. By means of this advantageous transfer of force, the spring force that acts on the piston in the coupling position is increased, and this has an advantageous effect on coupling, in particular on opening of the flow channel.

Furthermore, it has been shown to be advantageous, in accordance with a further embodiment, if the pressure bushing has a pressure bushing attachment, and that a reset means, in particular a helical spring, is arranged between pressure bushing attachment and sleeve inner body, wherein it is furthermore preferred that the pressure bushing attachment is screwed onto the pressure bushing. The reset means consequently acts between sleeve inner body and pressure bushing attachment, and forces the pressure bushing in the second direction, in other words in the direction of the starting position. The reset means is maximally compressed in the coupled position, in other words in the open position.

In particular so as to hold the valve tappet within the flow channel, it is provided, according to a further embodiment, that the valve tappet is held within the sleeve inner body by means of a tappet guide, advantageously clamped in place by means of a screwed-in clamping bushing. Consequently, the valve tappet is rigidly connected with the sleeve inner body, and moves simultaneously with the sleeve inner body. The tappet guide surrounds the valve tappet and, at the same time, lies against an inner circumference of the sleeve inner body. Along the coupling axis, the tappet guide is clamped in place by means of a clamping bushing that is screwed into the sleeve inner body.

According to a further embodiment, it has been proven to be advantageous, in particular for reliable closing of the flow channel, if it is provided that the valve tappet has a gasket at its valve tappet head, that the gasket is held at least partially by a chambering bushing, and that the chambering bushing engages over the gasket at least partially. Consequently, the gasket lies against an inner circumference of the pressure bushing, proceeding from the coupling axis, in the radial direction. The gasket is held against the valve tappet head by a chambering bushing; the head also engages over the gasket with an undercut. Preferably, the chambering bushing has a setback into which the gasket projects at least partially in a direction parallel to the coupling axis.

It has furthermore proven to be particularly advantageous if, according to a further embodiment, it is provided that the gasket has a T-shaped or cross-shaped cross-section, in particular that the gasket is held between a holding groove in the valve tappet head and the chambering bushing. In the case of a T-shaped gasket, the perpendicular T-base is directed in the direction of the pressure bushing, so that the horizontal T-crosspiece can engage, on the one hand, into a holding groove on the valve tappet head, on the other hand into a setback on the chambering bushing provided for this purpose. As a result, it is ensured that the gasket does not come loose from the valve tappet head even in the case of high flow velocities. It is provided that the horizontal T-crosspiece and the perpendicular T-crosspiece have the same length, or that the horizontal or the perpendicular T-crosspiece is shorter than the other one, in each instance.

Preferably, in order to reduce the pressure applied within the coupling element during coupling or uncoupling, it is provided, according to a further embodiment, that the sleeve body has a cylindrical attachment section, that a gap between housing and attachment section is closed off with a sealing means, forming a seal, in the uncoupled and in the coupled state of the coupling element, and that the sleeve body is displaced along the coupling axis, at least during coupling and uncoupling, in such a manner that a flow cross-section is formed to carry away pressure medium, in particular into a ring space.

The sealing means is configured as at least a gasket, for example. The sealing means is held on the cylindrical attachment section or on the housing, for example. In the uncoupled starting position and in the coupled open position, the gap between housing and attachment section is closed off by means of the sealing means. The sealing means and/or the attachment section and/or the housing are configured in such a manner that a displacement of the attachment section in a direction parallel to the coupling axis leads to the result that the sealing means no longer interacts with the housing and/or the attachment section, forming a seal, in the displaced position of the attachment section. If, for example, the sealing means, for example in the form of at least a gasket, is held on the attachment section, the sealing means interacts with a radially opposite sealing surface in the sealing state. For example, viewed along the coupling axis, to the right and the left of the sealing surface, a circumferential recess or a setback is provided, so that as the result of a displacement, no sealing effect exists any more relative to the sealing surface, and a flow cross-section, in particular a ring gap, is formed between the recess or the setback and the sealing means, through which cross-section or gap pressure medium can be carried away. It is also provided that the sealing surface has a smaller diameter than the regions that lie in front of and behind the sealing surface in the coupling axis direction, so that the flow cross-section is formed by the axial displacement between the sealing means and the larger diameter arranged on the right and on the left.

Furthermore, it is provided that the sealing means, in particular in the form of a gasket, is held on the housing. At least one sealing surface is then formed on the attachment section, wherein viewed in the coupling direction, a setback or a recess is provided on the right and on the left of the sealing surface. The flow cross-section is released when the sealing means is situated in the region of the setback or of the recess. Furthermore, it is provided that a sealing surface on the attachment section has a greater diameter than the regions that surround the sealing surface on the right and on the left, viewed in the coupling axis direction.

Consequently, pressure medium is carried away by means of a relative movement between sealing surface and sealing means, during both coupling and uncoupling.

It has proven to be particularly advantageous, according to an embodiment, if it is provided that the essentially cylindrical attachment section has at least a local widening in diameter, that the diameter widening interacts with at least a gasket, in particular one that acts radially on the diameter widening, forming a seal, in the uncoupled and in the coupled state of the coupling element, in particular in the starting position and in the open position, and that the sleeve body is displaced along the coupling axis, at least during coupling and uncoupling, in such a manner that a ring gap for carrying away pressure medium is formed between the diameter widening and the gasket. During the coupling process, during which a coupling plug is at least partially pushed into the interior of the housing by way of the connection interface of the coupling element, the sleeve body is also moved in the first direction, in other words into the housing. During this process, the attachment section is also displaced along the coupling axis, so that the gasket slides off the diameter widening and a ring gap is released between the gasket and the smaller diameter of the attachment section that surrounds the diameter widening, through which gap the pressure medium can be carried away, namely is introduced into a ring space that is present there, which space is connected with a pressure medium tank. The expanse of the diameter widening along the coupling axis is selected in such a manner that the movement of the sleeve body along the coupling axis during coupling and uncoupling leads to the result that the gasket slides off the diameter widening and a ring gap is released.

During uncoupling, the sleeve body is moved at least partially in the second direction, so that the gasket slides off the diameter widening on the opposite side, and a ring gap forms between the lesser diameter of the attachment section that is present on the other side of the diameter widening and the gasket, through which gap pressure medium can be carried away.

Consequently, pressure medium is carried away during both coupling and uncoupling, by means of a relative movement of the cylindrical attachment section relative to the gasket arranged on the diameter widening.

Preferably so as to prevent the coupling element from being coupled at overly high pressures within the coupling element, it is provided, according to a further embodiment, that a blocking means is present and that a movement of the sleeve inner body and/or of the sleeve body within the housing can be limited, preferably can be completely blocked with the blocking means, and that coupling of the coupling element is prevented by the limitation or blocking.

The blocking means consequently interacts with the sleeve inner body or the sleeve body, particularly with shape fit, in such a manner that a movement of the sleeve inner body and/or of the sleeve body is limited or blocked by the blocking means. As a result, no movement of the valve tappet or of the pressure bushing can take place even if an attempt is made to introduce the coupling plug into the connection interface of the coupling element, so that coupling is not possible. The blocking means consequently prevents coupling.

Particularly preferably, it is provided that the blocking means acts as a function of pressure, according to a further embodiment, in other words that a movement can be limited as a function of the pressure of the pressure medium applied in the coupling element, using the blocking means, in particular starting from a predetermined pressure threshold value, for example 1 MPa, 1.5 MPa or 2 MPa.

For this purpose, it is preferably provided that the blocking means has a tappet having at least a central passage bore and at least a spring. The tappet has a tappet head that is held in a holding space. The holding space stands in fluidic contact with the flow channel by way of the central passage bore, so that pressure medium present in the flow channel gets into the holding space also through the passage bore. The pressure threshold value, starting from which a movement of the tappet takes place, can be established by means of the geometry of the tappet head and the properties of the spring. Starting from a specific pressure threshold value, the tappet is consequently moved in the direction of the coupling axis by means of the pressure, and thereby the tappet blocks the movement of the sleeve body, in particular blocks a movement of the attachment section of the sleeve body.

A further embodiment provides that a display means is present, and that a pressure state within the housing can be displayed using the display means, and thereby coupling of the coupling element can be prevented at predetermined pressure states, using the display. The display means is configured to be mechanical and/or electrical and/or electromechanical. Preferably, the display means also has a tappet and a spring element. The tappet stands in connection with the flow channel, so that the pressure medium can act on at least an end of the tappet. By means of the pressure applied in the flow channel, the tappet is moved counter to the force of the spring starting from a specific pressure threshold value, so that on the outside of the coupling element, it is displayed by means of the projecting tappet that a specific pressure threshold value has been exceeded. The visibility of the tappet on the outside of the housing indicates to a user that coupling of the coupling element is not allowed to take place.

The task stated initially is furthermore accomplished in the case of a coupling element, in particular a coupling sleeve, for a hydraulic coupling of a pressure medium line. The coupling element comprises a housing having a sleeve body and a valve device, wherein the housing has at least a flow channel for a pressure medium and a coupling axis. The sleeve body is displaced within the housing along the coupling axis A during coupling and uncoupling, and the flow channel can be closed off and can be released using the valve device.

According to the invention, the sleeve body has a cylindrical attachment section having at least a local widening in diameter, wherein the diameter widening interacts with at least a gasket, forming a seal, in the coupled and in the uncoupled starting state of the coupling element. The sleeve body is displaced along the coupling axis A at least during coupling and/or uncoupling, in such a manner that a ring gap for carrying away pressure media, in particular into a ring space, is formed between the diameter widening and the gasket.

Because of the fact that a flow channel, in particular, specifically a ring space for carrying away pressure medium, is released during coupling and uncoupling, it is prevented that the pressure applied in the coupling element is too high for uncoupling or for coupling, since the pressure is reduced by means of carrying pressure fluid away into a ring space by way of the ring gap. The functionality and configuration are identical with the exemplary embodiment described above.

According to a first embodiment, it is preferably provided that the ring space is connected with a pressure medium tank. Because of the fact that the ring space is connected with a pressure medium tank, the excess pressure medium, which is not contaminated, is passed directly back into the tank.

Because of the high flow velocities, it has furthermore proven to be advantageous, according to an embodiment of the coupling element, if it is provided that the gasket is held between a first holding flank of the housing and a second holding flank of a clamping element, in particular that the clamping element is connected with the housing, preferably screwed onto it. The clamping element is preferably introduced into the housing, in particular screwed into it, and holds the gasket in such a manner that it can act on the diameter widening from the outside in a radial direction.

Furthermore, it has proven to be advantageous if, according to a further embodiment, it is provided that the gasket has a first holding collar and a second holding collar, and that the first holding collar and the second holding collar interact with the first holding flank and the second holding flank. Consequently, the gasket has an essentially T-shaped cross-section, wherein the first holding collar and the second holding collar lie behind the first holding flank or behind the second holding flank, respectively, in the radial direction, so that the gasket cannot escape in the radial direction. Furthermore, an O-ring is preferably provided, with which ring the gasket can be biased in the radial direction.

In particular so as to prevent the gasket from being pushed out of the holder at high flow velocities, it is provided, according to a further embodiment, that the gasket has a first side flank that proceeds from the first holding collar and a second side flank that proceeds from the second holding collar, and that the first side flank has a greater height than the second side flank in the radial direction. As a result, it is ensured that the gasket is reliably held in all flow situations.

The exemplary embodiments described above, relating to claims 1 and 17, can be combined with one another as desired, in advantageous manner.

Figure 2:
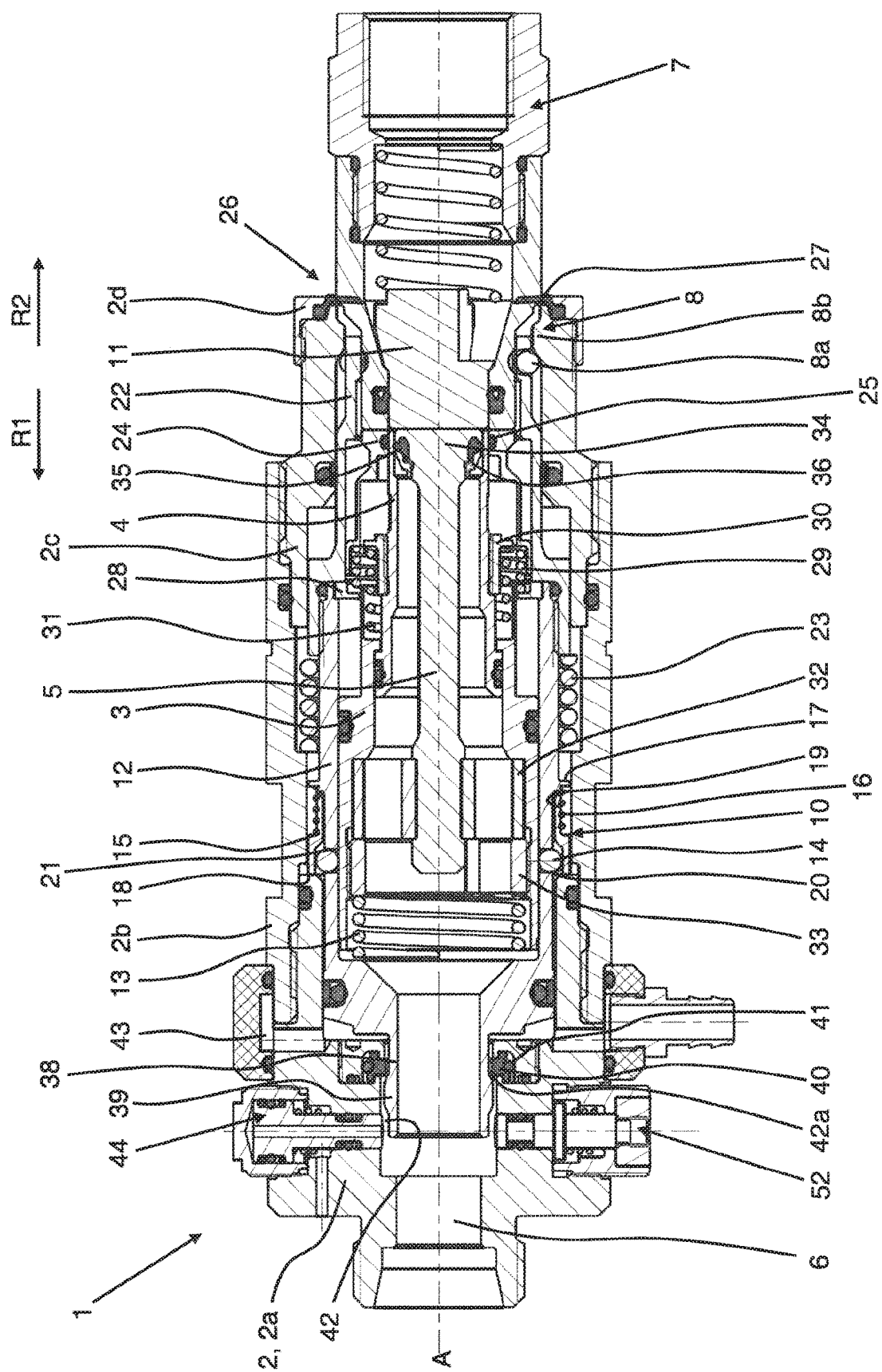
Figure 3:
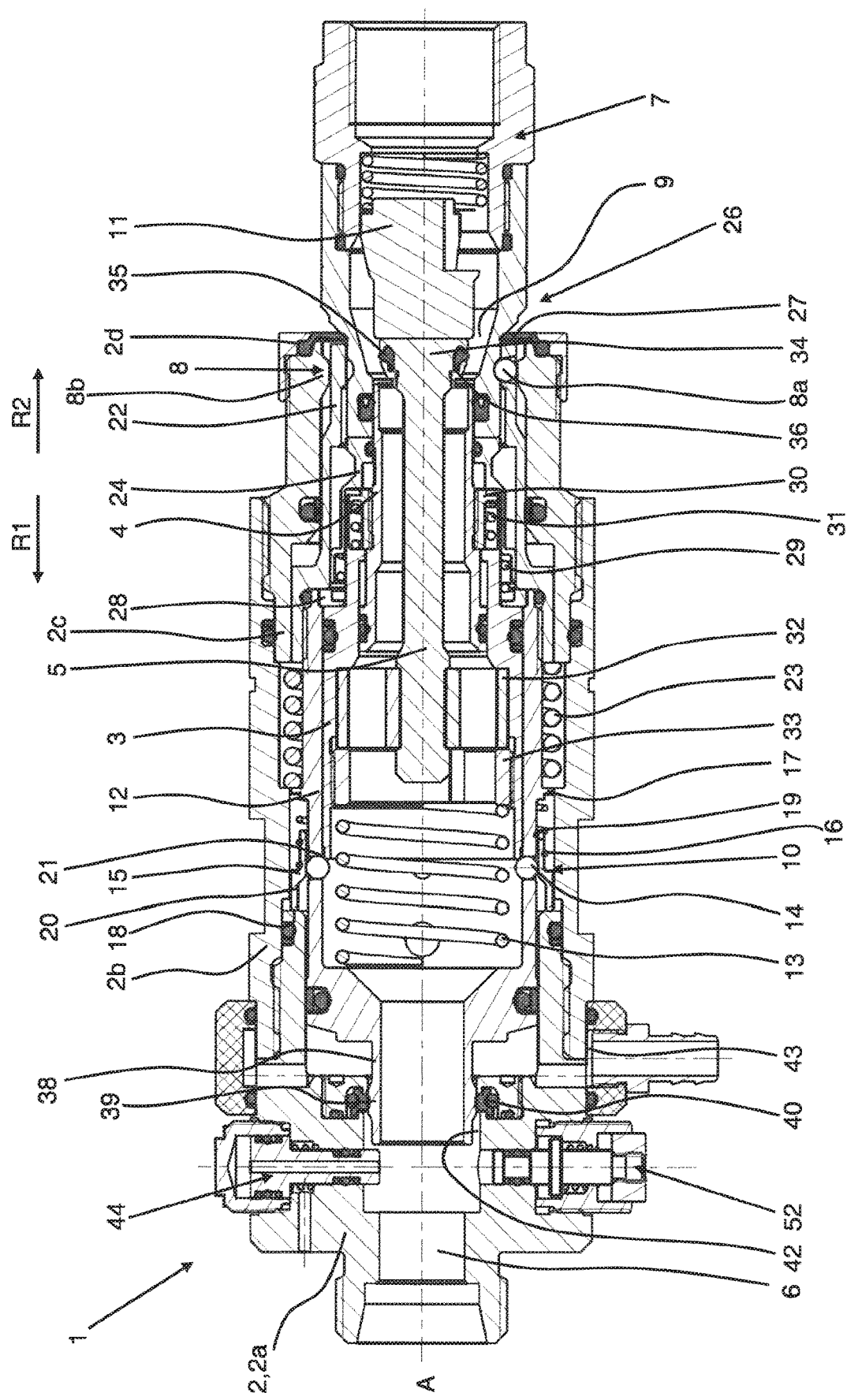
Figure 4:
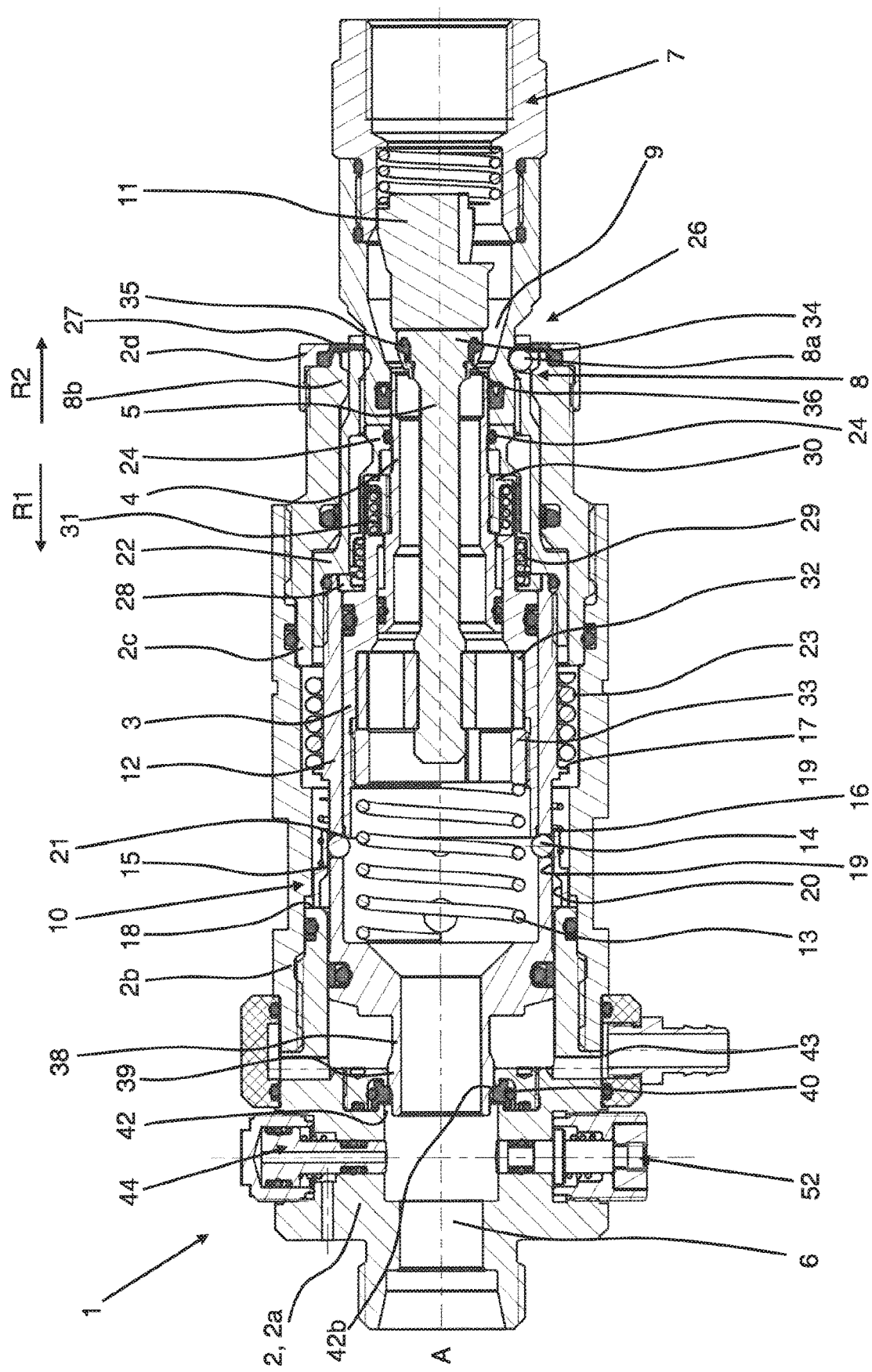
Figure 5:
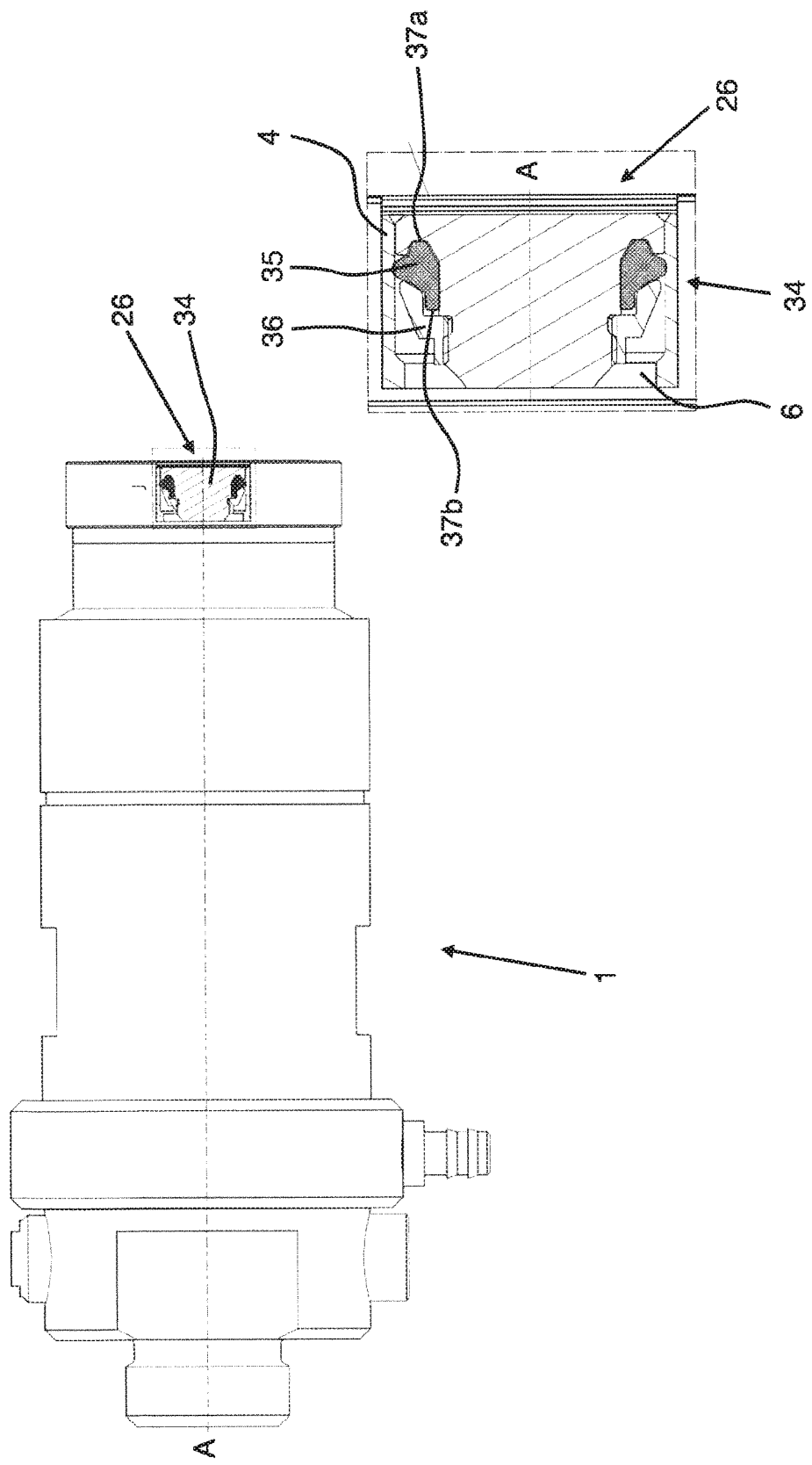
Figure 6:
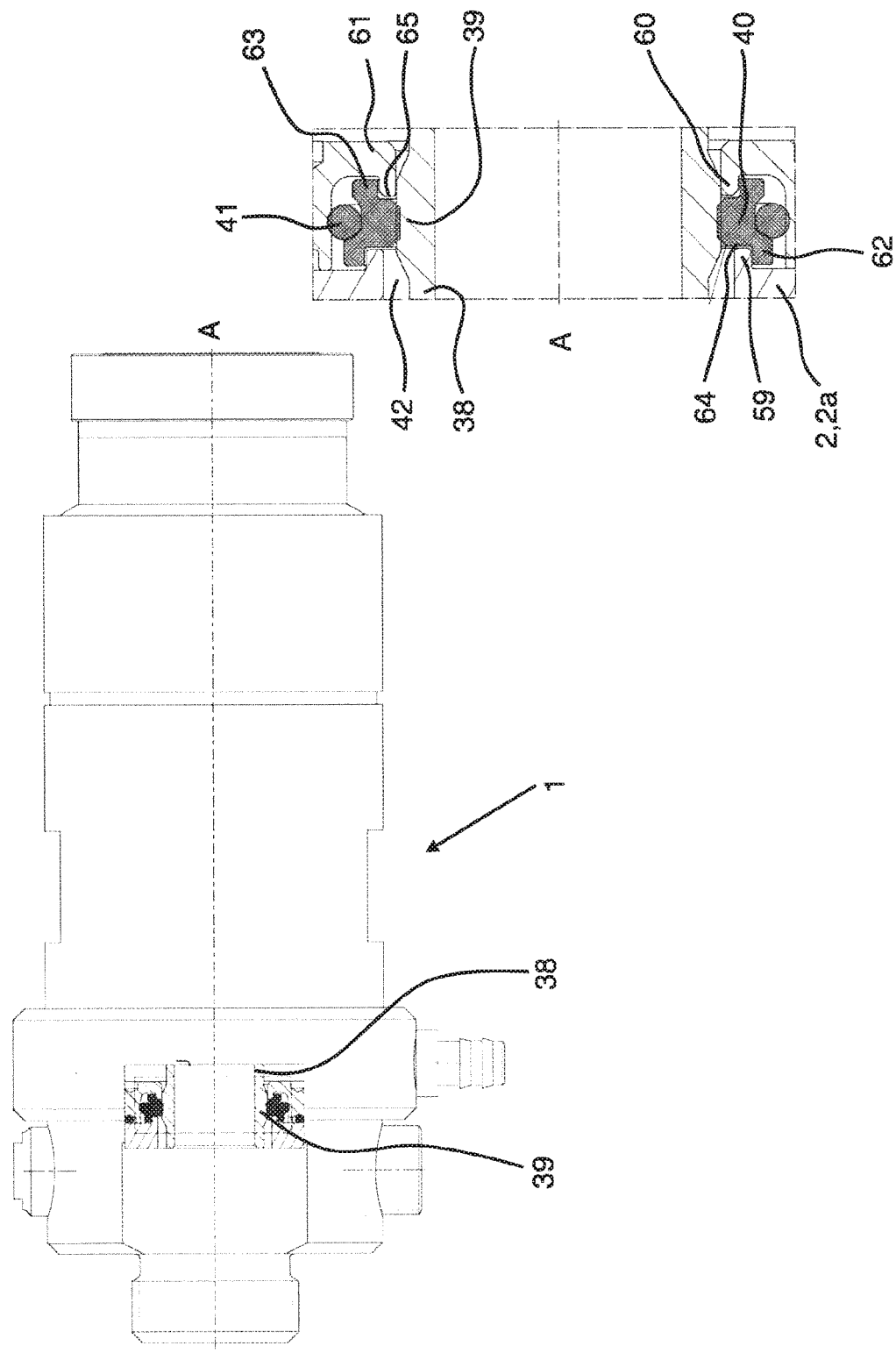
Figure 7:
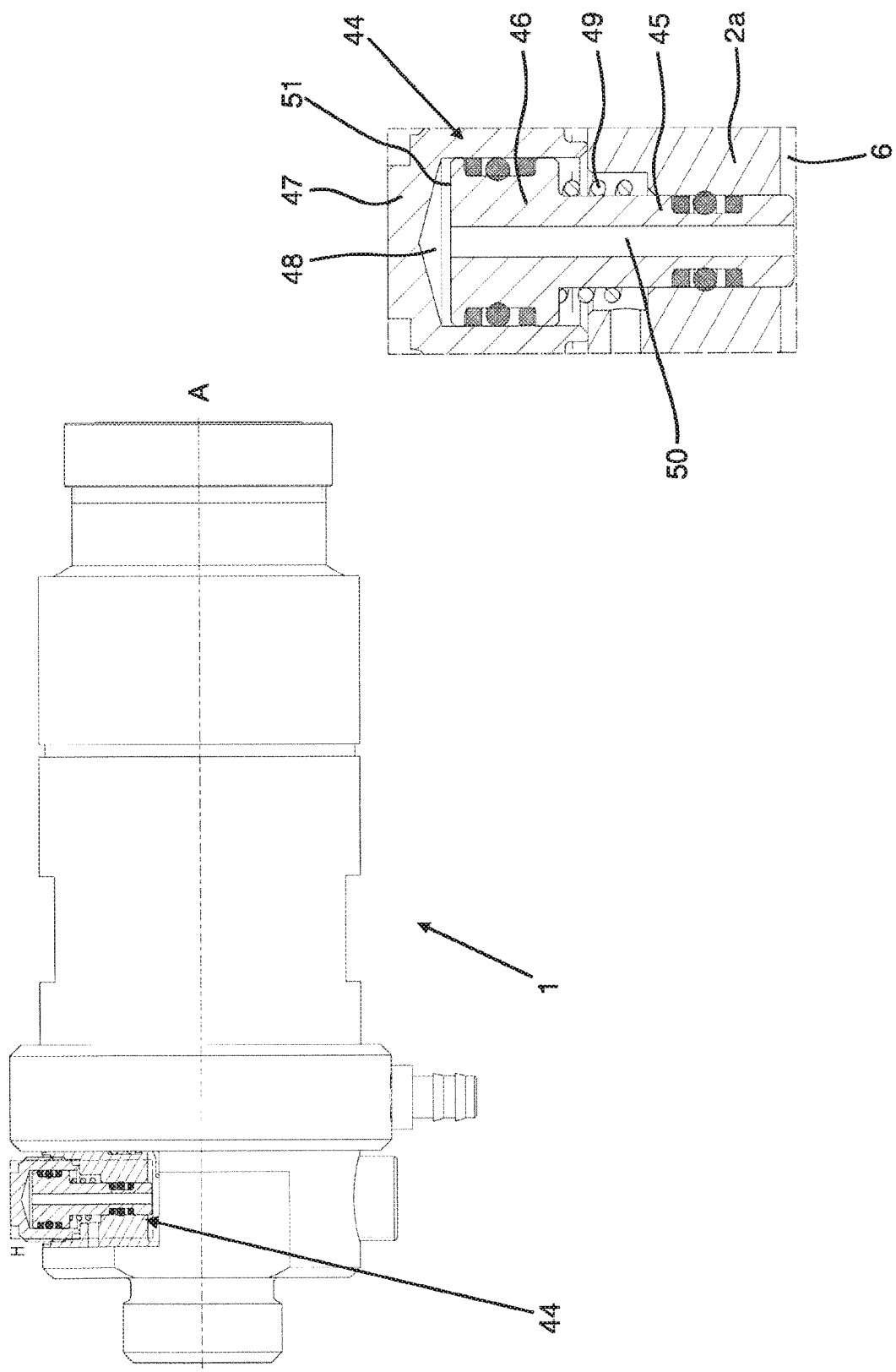
Figure 8:
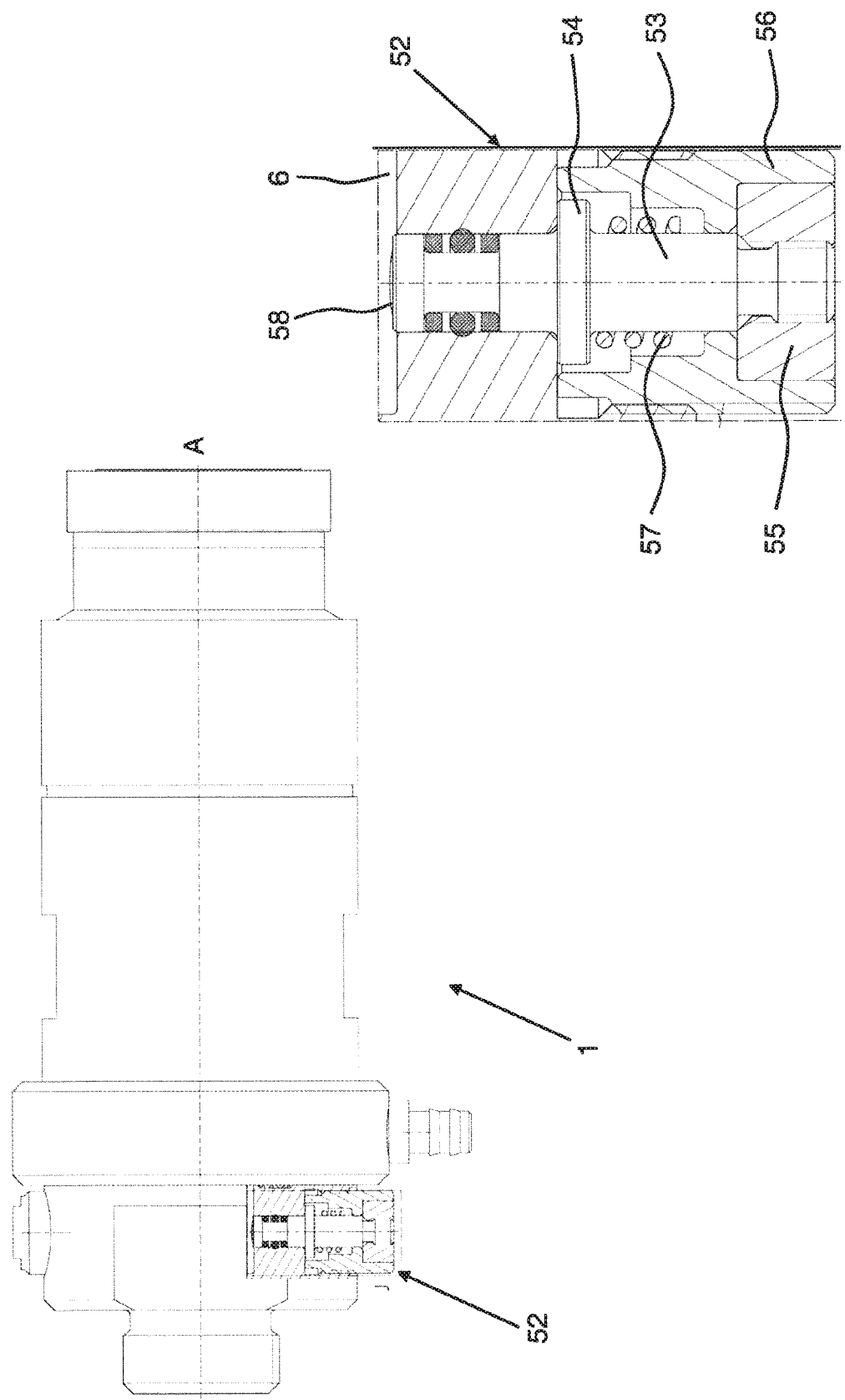
Figure 9:
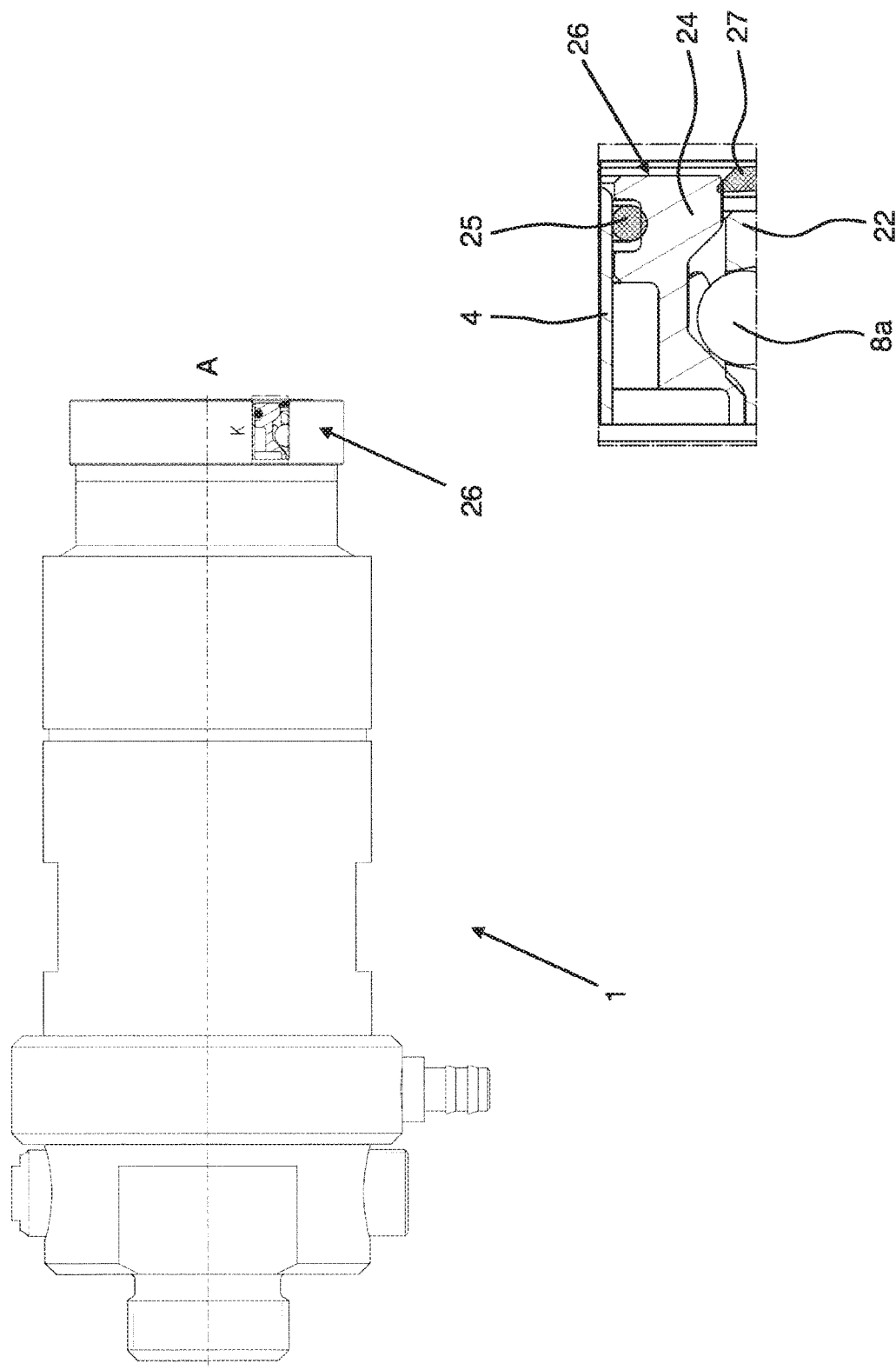
Figure 10:
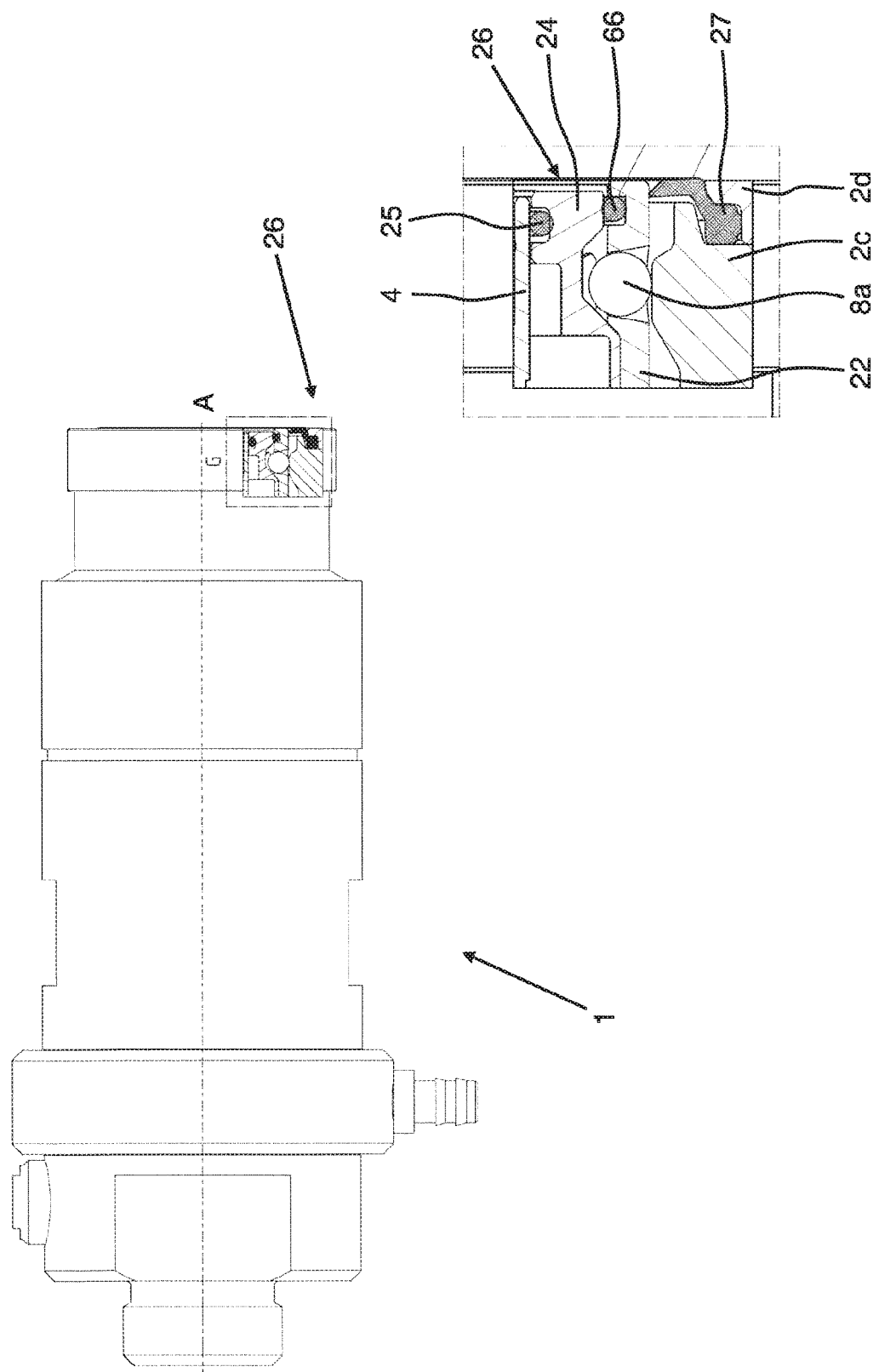

In detail, there is now a plurality of possibilities for configuring and further developing the coupling elements described. In this regard, reference is made both to the claims that are dependent on claims 1 and 17 and to the following description of preferred exemplary embodiments in connection with the drawing. The drawing shows:

FIG. 1 an exemplary embodiment of a coupling element in a sectional side view, FIG. 2 an exemplary embodiment of a coupling element in the coupling position, with the coupling plug introduced, FIG. 3 an exemplary embodiment of a coupling element in the open position, with the coupling plug introduced, FIG. 4 an exemplary embodiment of a coupling element ready for coupling, FIG. 5 an exemplary embodiment of a coupling element with a detail view of the valve tappet head, FIG. 6 an exemplary embodiment of a coupling element with a detail view of the diameter widening, FIG. 7 an exemplary embodiment of a coupling element with a detail view of a blocking means, FIG. 8 an exemplary embodiment of a coupling element with a detail view of a display means, FIG. 9 an exemplary embodiment of a coupling element with a detail view of a stripper gasket, FIG. 10 a further exemplary embodiment of a coupling element with a detail view of a stripper gasket.

FIGS. 1 to 4 show an exemplary embodiment of a coupling element 1 in different positions during the coupling process (FIG. 1 to FIG. 3) and during uncoupling (FIG. 4). The coupling element 1 is a coupling sleeve for a hydraulic coupling, in particular a quick coupling, on a pressure medium line that is not shown in any detail. The coupling element 1 has a housing 2, which is configured in four parts in the case of this exemplary embodiment, namely has a housing base element 2a, a first housing bushing 2b, a second housing bushing 2c, and a housing end element 2d. The housing parts 2a, 2b, 2c, and 2d are screwed onto one another, in each instance, and sealed relative to one another.

The coupling element 1 furthermore has a sleeve inner body 3, a pressure bushing 4, and a valve tappet 5. The valve tappet 5 is centrally held within a flow channel 6 formed in the housing 2. A coupling axis A also runs centrally through the housing 2 of the coupling element 1. The sleeve inner body 3, the pressure bushing 4, and the valve tappet 5 are held in the housing 2 so as to be displaceable along the coupling axis A.

For coupling, in other words for producing a mechanical and fluidic connection between the coupling element 1 and a coupling plug 7, during a coupling process at least the sleeve inner body 3, the pressure bushing 4, and the valve tappet 5 can be displaced along the coupling axis A, out of the starting position according to FIG. 1, in a first direction R1, into the housing 2, into a coupling position according to FIG. 2.

In the coupling position according to FIG. 2, the coupling plug 7 can be fixed in place on the housing 2 of the coupling element 1, with shape fit, by means of a barrier means 8, which here is configured as a plurality of barrier balls 8a distributed over the circumference, which balls interact with the housing 2, in particular a projection 8b. Proceeding from the coupling position according to FIG. 2, at least the sleeve inner body 3, the pressure bushing 4, and the valve tappet 5 are moved in a second direction R2, opposite to the first direction R1, along the coupling axis A, into a stop position of the pressure bushing 4, wherein the pressure bushing 4 is blocked in the stop position with regard to a further movement in the second direction R2.

Proceeding from the stop position, the sleeve inner body 3 and the valve tappet 5 move into the open position shown in FIG. 3, so that a flow cross-section 9 between the pressure bushing 4 and the valve tappet 5 is released. FIG. 3 also shows the stop position of the pressure bushing 4, in which a further movement in the direction R2 is blocked.

In the open position according to FIG. 3, a movement of the sleeve inner body 3 and of the valve tappet 5 in the first direction R1 is prevented by a locking means 10 that is situated in its barrier position. The coupling plug 7 cannot penetrate further into the housing 2 in the direction R1 and displace the sleeve inner body 3, since the coupling plug 7 is fixed in place by the barrier means 8.

The movement of the sleeve inner body 3, the pressure bushing 4, and the valve tappet 5 out of the coupling position, in the direction of the open position, takes place by means of a pressure of a pressure medium that is applied to the coupling element 1 and acts in the flow channel 6. Consequently, the pressure medium brings about the result that the pressure bushing 4 is forced at least partially into the coupling plug 7. During this process, in the open position according to FIG. 3, the valve tappet 11 of the coupling plug 7 is pressed back by the valve tappet 5 of the coupling element 1 to such an extent that the flow channel 9 has been released. As a result, the force to be applied by a user for the coupling process is advantageously reduced.

The starting position shown in FIG. 1 can be reached, proceeding from the open position shown in FIG. 3 and FIG. 4, by means of an uncoupling process, in that according to FIG. 4 the barrier means 8 is released by means of displacement of the housing 2 relative to the barrier means 8, as shown in FIG. 4, so that the coupled coupling plug 7 can be removed. According to FIG. 4, the barrier balls 8a of the barrier means 8 can escape into a setback in the housing 2, in particular in the housing bushing 2c, that lies next to the projection 8b.

By means of removing the coupling plug 7 in the direction R2, a movement of the pressure bushing 4 also in the second direction R2 is released, until the pressure bushing 4 according to FIG. 1 lies against the valve tappet 5 again, forming a gasket, and the flow channel 6 is completely closed off.

According to FIGS. 1 to 4, a sleeve body 12 is present, in which sleeve body, in particular on its inner circumference, the sleeve inner body 3 is guided and can be moved along the coupling axis A. Furthermore, a reset means 13 in the form of a helical spring, which acts between sleeve body 12 and sleeve inner body 3, is provided, which spring is maximally compressed in the coupling position shown in FIG. 2. From the coupling position, the reset means 13 brings about a force in the direction R2, which supports penetration into the coupling plug 7 for achieving the open position.

According to FIGS. 1 to 4, the locking means 10 has a plurality of locking balls 14 distributed over the circumference, at least a barrier bushing 15 that surrounds the sleeve body 12 on its outer circumference, as well as at least a spring element 16. The spring element 16 acts on the sleeve body 12 between the barrier bushing 15 and an attachment 17. The spring element 16 constantly forces the barrier bushing 15, in particular in the first direction R1, in the direction of or against a stop surface 18 of the housing 2, in particular of the housing base body 2a. The barrier bushing 15 has a first inner circumference surface 19 and a second inner circumference surface 20, which each have a different inside diameter. In the barrier state of the locking element 10 shown in FIG. 1, the locking balls 14 are forced at least partially into the sleeve body 12, from the first inner circumference surface 19, through the recesses 21, so that a movement of the sleeve inner body 3 in the first direction R1 within the sleeve body 12 and relative to the sleeve body 12 is blocked by means of the locking balls 14.

If—proceeding from the starting position in FIG. 1—a force is now brought about on the valve tappet 5, the pressure bushing 4, and thereby also on the sleeve inner body 3, parallel to the coupling axis A, for example by means of a coupling plug 7, these components are moved, together with the sleeve body 12, in the first direction R1. During this process, the locking balls 14 slide along the first inner circumference surface 19 until they can escape in the direction of the second inner circumference surface 20, which lies on the greater diameter, and thereby a movement of the sleeve inner body 3 relative to the sleeve base body 22 is released. As a result, the sleeve inner body 3 can dip further into the sleeve base body 22, and thereby the reset means 13 is compressed (see FIG. 2).

Proceeding from the coupling position according to FIG. 2, at first, compression of the spring element 16 by the force proceeding from the locking balls 14 on the barrier bushing 15 takes place in the case of a movement of the sleeve body 12 as well as of the sleeve inner body 3 in the second direction R2. As soon as the sleeve inner body 3, in its open position according to FIG. 3, allows a movement of the locking balls 14 at least partially into the interior of the sleeve body 12, the locking balls 14 are forced into the interior of the sleeve body 12 under the effect of the spring 16, by means of the barrier bushing 15, and thereby the barrier state according to FIG. 1 and FIG. 4 is achieved once again.

A sleeve base body 22 is firmly connected with the sleeve body 12, wherein the sleeve base body 22 is screwed onto the sleeve body 12. The sleeve body 12 and the sleeve base body 22 consequently move simultaneously with one another. The sleeve base body 22 interacts with the barrier means 8 for the coupling plug 7. The barrier balls 8a pass partially through the sleeve base body 22 and are held by the sleeve base body 22. The coupling plug 7 is rigidly fixed in place with regard to the sleeve base body 22 and thereby also with regard to the sleeve body 12 by means of the barrier balls 8a in their barrier position according to FIG. 3.

FIG. 1 also shows a barrier position of the barrier means 8, namely that a movement of a piston 24 in the first direction R1 by means of the barrier balls 8a is possible, at first, only together with the sleeve base body 22. Coupling therefore takes place in such a manner that the piston 24 and the sleeve base body 22 are moved together by way of the barrier balls 8a, until an escape movement of the barrier balls 8a into a setback in the second housing bushing 2c that lies next to the projection 8b is possible.

Furthermore, a sleeve reset means 23 is provided within the housing 2, which means supports itself both on the first housing bushing 2b and also on the second housing bushing 2c, and, depending on the direction R1, R2 in which the sleeve body 12 and the sleeve base body 22 are deflected, on the sleeve body 12 (FIG. 4) or on the sleeve base body 22 (FIG. 2).

According to FIG. 2, the sleeve reset means 23 supports itself on the first housing bushing 2b as well as on the sleeve base body 22. During uncoupling according to FIG. 4, the sleeve reset means 23 supports itself on the second housing bushing 2c as well as on the step 17 of the sleeve body 12. The sleeve reset means 23 ensures that the sleeve body 12 and the sleeve base body 22 are reset back into a neutral position, by means of a movement in the direction R2, after a deflection in the direction R1, which took place by means of the force proceeding from the coupling plug 7. When the coupling plug 7 is removed, a movement of the sleeve body 12 and of the sleeve base body 22 in the direction R2 is caused, from which the sleeve reset means 23 once again brings about a reset in the direction R1, into the neutral starting position according to FIG. 1 and FIG. 3.

According to FIGS. 1 to 4, the coupling element 1 furthermore has the piston 24, which surrounds the pressure bushing 4. A gasket 25 is arranged between piston 24 and pressure bushing 4. The piston 24 at least partially closes off the connection interface 26 of the coupling element 1 in the starting position according to FIG. 1. Furthermore, a stripper gasket 27 is provided at the connection interface 26, which gasket lies against the piston 24 in the starting state according to FIG. 1 and prevents entry of dirt into the coupling element 1.

Viewed along the coupling axis A, a support bushing 28 is clamped in place between sleeve base body 22 and sleeve body 12, which bushing serves as a bearing for a piston spring 29 arranged between piston 24 and support bushing 28. Because of the fact the that piston spring 29 supports itself on the support bushing 28, the force on the sleeve inner body 3 is reduced, proceeding from the piston spring 29, so that higher forces can be applied for opening the coupling plug 7 from the coupling position according to FIG. 2.

The piston 24 is forced in the first direction R1—see FIG. 2—during the coupling process, together with the valve tappet 5 and the pressure bushing 4, by a coupling plug 7. During this process, the piston spring 29 is compressed. In the open position according to FIG. 3, the piston 24 continues to be held within the housing 2 by the coupling plug 7, wherein the piston 24 serves as a stop for the pressure bushing 4, so as to fix the pressure bushing 4 in place in the stop position.

If uncoupling now takes place, the coupling plug 7—after release by means of a relative movement of the housing 2 relative to the barrier balls 8a—is removed from the coupling element 1 in the direction R2, according to FIG. 4, and thereby the piston 24 is forced in the direction of the starting position according to FIG. 1 by means of its piston spring 29. At the same time, the piston 24 thereby releases a movement of the pressure bushing 4 in the direction of its starting position according to FIG. 1, so that the flow channel 6 can be closed off by means of the pressure bushing 4 and the valve tappet 5, according to FIG. 1.

The pressure bushing 4 has a pressure bushing attachment 30, which is screwed onto the pressure bushing 4. A reset means 31 in the form of a helical spring is arranged between the pressure bushing attachment 30 and the sleeve inner body 3. The reset means 31 constantly forces the pressure bushing 4 in the second direction R2 by means of the pressure bushing attachment 30.

The valve tappet 5 is held centrally within the flow channel 6 by means of a tappet guide 32, wherein the tappet guide 32 is held with shape fit within the sleeve inner body 3 and fixed in place by means of a screwed-in clamping bushing 33. The valve tappet 5 consequently always moves simultaneously with the sleeve inner body 3.

During the coupling process, in other words during coupling, consequently at first the piston 24 and the sleeve base body 22 and thereby also the sleeve body 12 as well as the sleeve inner body 3, the valve tappet 5, and the pressure bushing 4 are moved in the direction R1, into the interior of the housing 2, by means of the force proceeding from a coupling plug 7. Starting from the position between housing 2 and barrier balls 8a, from which the barrier balls 8a can escape in the direction of the housing 2, the piston 24, the pressure bushing 4, the valve tappet 5, as well as the sleeve inner body 3 are pushed further into the housing 2, in particular into the sleeve body 12—even after release by the locking means 10—until the coupling plug 7 can be fixed in place on the housing 2 using the barrier means 8. After the coupling plug 7 is attached, during which process the sleeve body 12 and the sleeve base body 22 have been displaced into their neutral position by the sleeve reset means 23, the sleeve inner body 3, the valve tappet 5, and the pressure bushing 4 are displaced in the direction of the coupling plug 7—in the second direction R2—by the pressure medium. During this process, the pressure bushing 4 penetrates into the coupling plug 7 until it lies against the piston 24. Only the sleeve inner body 3 with the valve tappet 5 are moved further until a flow cross-section 9 is opened and the locking means 10 gets into its locking position, so that the sleeve inner body 3 can no longer be displaced relative to the sleeve body 12.

According to FIG. 1 to FIG. 4 and FIG. 5, the valve tappet 5 has a valve tappet head 34, on which a gasket 35 is arranged. The gasket 35 is held on the valve tappet head 34 by a chambering bushing 36, in that the chambering bushing 36 is screwed onto the valve tappet head 34. The gasket 35 has an essentially T-shaped cross-section and is held in a first holding groove 37a in the valve tappet head 34 and a second holding groove 37b formed between chambering bushing 36 and valve tappet head 34. The chambering bushing 36 engages over the gasket 35 to form the second holding groove 37b as well as the holding groove 37a, so that the gasket 35 is reliably held on the valve tappet head 34 even in the case of high flow velocities. The gasket 35 is clamped in place between the first holding groove 37a and the second holding groove 37b of the chambering bushing 36, in the direction of the coupling axis A. The gasket 35 lies against the pressure bushing 4 in the radial direction, proceeding from the coupling axis A, and thereby seals off the flow channel 6 between valve tappet head 34 and the pressure bushing 4.

According to FIG. 1 to FIG. 4 and FIG. 6, the sleeve body 12 has an essentially cylindrical attachment section 38, wherein the attachment section 38 has a local diameter widening 39. The local diameter widening 39 is characterized in that the diameter of the cylindrical attachment section 38 is smaller in front of and behind the local diameter widening 39 than the diameter of the diameter widening 39. Preferably, a transition region having a flank angle between 20° and 30°, in particular 25°, to the coupling axis A is formed on both sides between attachment section 38 and diameter widening 39. FIG. 6 shows the starting position according to FIG. 1, in which the diameter widening 39 interacts with a gasket 40, forming a seal. The gasket 40 acts toward the coupling axis A in the radial direction, and is biased in the radial direction by means of an O-ring 41. During coupling according to FIG. 2 and during uncoupling according to FIG. 4, the sleeve body 12 and thereby the cylindrical attachment section 38 are displaced along the coupling axis A in such a manner that a ring gap 42a according to FIG. 2 or a ring gap 42b according to FIG. 4 is formed between the diameter widening 38 and the gasket 40, through which gap a pressure medium can be carried away into a ring space 43. By means of this pressure relief, the coupling process and the uncoupling process are simplified, since the pressure medium can escape from the volume of the coupling element 1.

The coupling element 1 furthermore has a blocking means 44 according to FIG. 1 to FIG. 4 and FIG. 7, with which means a movement of the sleeve body 12 within the housing 2 can be limited in such a manner that coupling of the coupling element 1 is prevented by the blocking means 44. FIG. 1, FIG. 2, and FIG. 4 show the blocking means 44 in the release position, FIG. 3 shows the blocking means 44 in its barrier position, in which a movement of the sleeve body 12 in the first direction R1 is limited. The blocking means 44 has a tappet 45 having a tappet head 46 as well as a pressure space 48 formed by a cap 47.

Furthermore, a spring element 49 and a passage channel 50 that passes centrally through the tappet 45 are provided.

The passage channel 50 and thereby also the pressure space 48 stand in connection with the flow channel 6, so that the pressure medium can get into the pressure space 48 through the passage channel 50. The spring 49 constantly forces the tappet 45 into its release position. If the pressure in the flow channel 6 now increases, and thereby also the pressure in the pressure space 48 increases, in particular on the ring-shaped end surface 51 of the tappet 45, the latter is forced into its barrier position according to FIG. 3, in other words in the direction of the flow channel 6, starting from a specific pressure threshold value. Only when the force of the spring 49 is greater than the force resulting from the pressure on the end surface 51 does the tappet 45 move back into its release position. As a result, coupling can be reliably prevented as a function of pressure, in other words as a function of a pressure threshold value.

Furthermore, the coupling element 1 according to FIG. 1 to FIG. 4 and FIG. 8 has a display means 52. Using the display means 52, a pressure state within the housing 2 can be displayed, in particular it can be displayed if a specific pressure threshold value has been exceeded. The display means 52 has a display tappet 53 having a ring collar 54 and a signal head 55. A spring element 57 acts between a cap 56 and the ring collar 54, which element forces the display tappet 53 into its neutral position according to FIG. 8. If the pressure within the flow channel 6 now rises above a previously established pressure threshold value, namely the pressure on the end surface 58 of the display tappet 53, in such a manner that the spring force of the spring 57 is exceeded, the display tappet 53 is forced out of its neutral position according to FIG. 8 into a display position, in which the signal head 55 projects out of the cap 56 and thereby indicates that a pressure threshold value suitable for coupling has been exceeded. FIGS. 1, 2, and 4 show the neutral state of the display means 52, wherein FIG. 3 shows the display state in which the signal head 55 has exited from the cap 56.

According to FIG. 6, the gasket 40 is held between a first holding flank 59 of the housing 2, in particular of the housing base body 2a, and a second holding flank 60 of a clamping element 61. For this purpose, the clamping element 61 is screwed onto the housing 2. The holding flank 59 is arranged on a greater diameter than the holding flank 60. The gasket 40 has an essentially T-shaped cross-section with a first holding collar 62 and a second holding collar 63. The first holding collar 62 is overlapped by the first holding flank 59, and the second holding collar 63 is overlapped by the second holding flank 60, in particular parallel to the coupling axis A, so that the gasket 40 is reliably held in the housing 2.

On the basis of the special flow conditions during opening of the ring gap 42a, 42b, the gasket 40 is structured in such a manner that a first side flank 64 that proceeds from the first holding collar 62 has a greater radial height than a second side flank 65 that proceeds from the second holding collar 63. For this purpose, the second holding flank 60 consequently has a lesser radial distance from the coupling axis A than the first holding flank 59. By means of such a geometry of the gasket 40 and of the first holding flank 59 and of the second holding flank 60, the gasket 40 is reliably held on the housing 2 under all possible flow situations. The first holding flank 59 and the second holding flank 60 reliably support the gasket 40 in the case of forces that occur parallel to the coupling axis A.

FIG. 9 shows an exemplary embodiment of a coupling element 1 with a detail view of a stripper gasket 27. The stripper gasket 27 is clamped in place in the edge region between the housing end element 2d and the second housing bushing 2c, and extends in planar manner in the radial direction, toward the coupling axis A. The stripper gasket 27 extends to such an extent that it covers the sleeve base body 22 at the connection interface 26 in the starting position (according to FIG. 1) and lies radially against an outer circumference of the piston 24.

FIG. 10 shows an exemplary embodiment of a coupling element 1 with a further exemplary embodiment of a stripper gasket 27 at the connection interface 26. The stripper gasket 27 is clamped in place with a widened clamping region, which preferably has an essentially rectangular cross-section, between the second housing bushing 2c and the housing end element 2d. Proceeding from the clamping region, the stripper gasket 27 at first extends at an incline in the direction of the connection interface 26, so as to extend radially in the direction of the coupling axis A at the connection interface 26. The stripper gasket 27 is configured in such a manner that it extends radially in the starting position, to such an extent that the stripper gasket 27 lies against an outer circumference of the sleeve base body 22. A further stripper gasket 66 in the form of an O-ring is provided between sleeve base body 22 and piston 24.

The invention claimed is:

1. A coupling element for a hydraulic coupling on a pressure medium line, having
    a housing,
    a sleeve inner body,
    a pressure bushing, and
    a valve tappet,
    wherein the housing has at least a flow channel for a pressure medium and a coupling axis A,
    wherein the sleeve inner body, the pressure bushing, and the valve tappet are held within the housing so as to be displaceable along the coupling axis A,
    wherein at least the sleeve inner body, the pressure bushing, and the valve tappet can be displaced during a coupling process, from a starting position, along the coupling axis, in a first direction, into the housing, into a coupling position,
    wherein in the coupling position a coupling plug can be fixed in place on the coupling element by means of a barrier means,
    wherein at least the sleeve inner body, the pressure bushing, and the valve tappet can be displaced out of the coupling position in a second direction, opposite to the first direction, along the coupling axis A, all the way to a stop position,
    wherein in the stop position, further movement at least of the pressure bushing in the second direction is blocked,
    wherein the sleeve inner body and the valve tappet can be moved further in the second direction, all the way into an open position,
    wherein in the open position, a flow cross-section between the pressure bushing and the valve tappet is released,
    wherein in the open position, a locking means acts on the sleeve inner body and the valve tappet,
    wherein a sleeve body is present,
    wherein the sleeve inner body is guided in the sleeve body,
    wherein a reset means in the form of a spring is arranged between the sleeve body and the sleeve inner body,
    wherein the locking means has at least a locking ball, at least a barrier bushing, and at least a spring element, and
    wherein the locking means acts between sleeve body and sleeve inner body.

2. The coupling element according to claim 1,
    wherein the starting position can be reached proceeding from the open position, by means of an uncoupling process,
    wherein the barrier means is released by means of displacement of at least a part of the housing relative to the barrier means, so that a coupled coupling plug can be removed, and
    wherein a movement of the pressure bushing in the second direction is released by means of removal of the coupling plug, until the pressure bushing lies against the valve tappet, forming a seal.

3. The coupling element according to claim 1,
    wherein a sleeve base body is present,
    wherein the sleeve base body is connected with the sleeve body and
    wherein a sleeve reset means acts between the sleeve body and the housing and/or between the sleeve base body and housing.

4. The coupling element according to claim 1,
    wherein at least a piston is present,
    wherein the piston surrounds the pressure bushing, and
    wherein the piston closes a connection interface of the coupling element off at least partially in the starting position.

5. The coupling element according to claim 3,
    wherein viewed in the direction of the coupling axis, a support bushing is arranged between sleeve base body and sleeve body, and
    wherein the support bushing serves as a bearing for a piston spring arranged between piston and support bushing.

6. The coupling element according to claim 1,
    wherein the pressure bushing has a pressure bushing attachment, and
    wherein a further reset means is arranged between the pressure bushing attachment and the sleeve inner body.

7. The coupling element according to claim 1, wherein the valve tappet is held within the sleeve inner body by a tappet guide.

8. The coupling element according to claim 1,
    wherein the valve tappet has a gasket at a valve tappet head, and
    wherein the gasket is held at least partially by a chambering bushing, and
    wherein the chambering bushing engages over the gasket at least partially.

9. The coupling element according to claim 8, wherein the gasket has a T-shaped or cross-shaped cross-section.

10. The coupling element according to claim 1,
    wherein the sleeve body has a cylindrical attachment section,
    wherein a gap between the housing and the attachment section is closed off with a sealing means, forming a seal, in the uncoupled and in the coupled state of the coupling element, and
    wherein the sleeve body is displaced along the coupling axis, at least during coupling and uncoupling, in such a manner that a flow cross-section is formed to carry away pressure medium.

11. The coupling element according to claim 10,
    wherein the attachment section has at least a local diameter widening,
    wherein the diameter widening interacts with at least a gasket in the uncoupled and in the coupled state of the coupling element, forming a seal, and
    wherein the sleeve body is displaced along the coupling axis, at least during coupling and uncoupling, in such a manner that a ring gap for carrying away pressure medium is formed between the diameter widening and the gasket.

12. The coupling element according to claim 1,
wherein a blocking means is present, and
wherein a movement of the sleeve inner body and/or of the sleeve body within the housing can be limited with the blocking means, and
wherein coupling of the coupling element is prevented by the limitation.

13. The coupling element according to claim 12, wherein a movement can be limited as a function of the pressure of the pressure medium applied in the coupling element, using the blocking means.

14. The coupling element according to claim 1,
wherein a display means is present, and
wherein a pressure state within the housing can be displayed using the display means, and thereby coupling of the coupling element can be prevented at predetermined pressure states, using the display.

15. A coupling element for a hydraulic coupling on a pressure medium line, having
a housing,
a sleeve body, and
a valve device,
wherein the housing has at least a flow channel for a pressure medium and a coupling axis A,
wherein the sleeve body is held within the housing so as to be displaceable along the coupling axis A, at least during coupling and uncoupling, and
wherein the flow channel can be closed off and released using the valve device,
wherein the sleeve body has a cylindrical attachment section,
wherein a gap between the housing and the attachment section is closed off with a sealing means, forming a seal, in the uncoupled and in the coupled state of the coupling element, and
wherein the sleeve body is displaced along the coupling axis (A), at least during coupling and uncoupling, in such a manner that a flow cross-section is formed to carry away pressure medium,
wherein the attachment section has at least a local diameter widening,
wherein the diameter widening interacts with at least a gasket in the uncoupled and in the coupled state of the coupling element, forming a seal, and
wherein the sleeve body is displaced along the coupling axis, at least during coupling and/or uncoupling, in such a manner that a ring gap for carrying away pressure medium is formed between the diameter widening and the gasket.

16. The coupling element according to claim 15, wherein the ring space is connected with a pressure medium tank.

17. The coupling element according to claim 15, wherein the gasket is held between a first holding flank of the housing and a second holding flank of a clamping element.

18. The coupling element according to claim 17,
wherein the gasket has a first holding collar and a second holding collar, and
wherein the first holding collar and the second collar interact with the first holding flank and the second holding flank.

19. The coupling element according to claim 18,
wherein the gasket has a first side flank that proceeds from the first holding collar and a second side flank that proceeds from the second holding collar, and
wherein the first side flank has a greater radial height than the second side flank.

* * * * *